(12) United States Patent
Fridley

(10) Patent No.: US 7,172,397 B2
(45) Date of Patent: Feb. 6, 2007

(54) TWO-PIECE WATER BOX ASSEMBLY FOR PELLETIZER

(75) Inventor: Michael A. Fridley, Eagle Rock, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 146 days.

(21) Appl. No.: 10/714,913

(22) Filed: Nov. 18, 2003

(65) Prior Publication Data

US 2005/0106277 A1  May 19, 2005

(51) Int. Cl.
*B29B 9/06* (2006.01)

(52) U.S. Cl. .................. 425/70; 425/71; 425/192 R; 425/313

(58) Field of Classification Search ............ 425/67, 425/70, 71, 192 R, 313, 311
See application file for complete search history.

(56) References Cited

U.S. PATENT DOCUMENTS

| | | | |
|---|---|---|---|
| 2,401,232 A * | 5/1946 | Donahey | 425/311 |
| 2,929,107 A | 3/1960 | Andrew | |
| 3,230,582 A | 1/1966 | Hoffman et al. | |
| 3,317,957 A | 5/1967 | Heston et al. | |
| 3,618,162 A | 11/1971 | Scharer et al. | |
| 4,123,207 A | 10/1978 | Dudley | |
| 4,251,198 A | 2/1981 | Altenburg | |
| 4,300,877 A * | 11/1981 | Andersen | 425/67 |
| 4,321,026 A * | 3/1982 | Lambertus | 425/142 |
| 4,529,370 A | 7/1985 | Holmes et al. | |
| 4,621,996 A | 11/1986 | Hundley, III | |
| 4,640,672 A * | 2/1987 | Ellwood | 425/192 R |
| 4,710,113 A | 12/1987 | Voigt | |
| 4,728,276 A | 3/1988 | Pauley et al. | |
| 5,059,103 A | 10/1991 | Bruckmann et al. | |
| 5,190,768 A | 3/1993 | Ishida et al. | |
| 5,593,702 A * | 1/1997 | Harris et al. | 425/67 |
| 5,624,688 A | 4/1997 | Adams et al. | |
| 6,474,969 B1 | 11/2002 | Ready et al. | |

* cited by examiner

*Primary Examiner*—Joseph S. Del Sole
(74) *Attorney, Agent, or Firm*—Jacobson Holman PLLC

(57) ABSTRACT

A two-piece water box assembly includes a water box main body and an inline adapter ring. The water box main body and inline adapter ring define the water box cutting chamber, with the inline adapter ring being positioned between the water box main body and the die plate. The adapter ring is fastened through the die plate to the extruder inlet housing with a first plurality of fastening elements. The water box main body is also coupled to the extruder inlet housing, through apertures in the die plate and inline adapter ring, by a second plurality of fastening elements, preferably less in number than the first plurality of fastening elements. When access to the cutter hub or cutting chamber is necessary for cleaning or otherwise, the water box main body can be removed easily by unfastening the second fastening elements only, while the inline adapter ring remains fixed to the die plate and extruder inlet housing, thus maintaining the seal therewith and the die plate insulation gasket.

20 Claims, 5 Drawing Sheets

TWO-PIECE WATER BOX ASSEMBLY FOR PELLETIZER

BACKGROUND OF THE INVENTION

1. Field of the Invention

The present invention generally relates to improvements in underwater pelletizers and more particularly to the water box of an underwater pelletizer constructed of a two-piece assembly for improved access to the cutter hub.

2. Description of the Prior Art

Underwater pelletizers are well known and operate in conjunction with a die plate having multiple orifices through which molten polymer or other extrudable material is extruded from the inlet housing of an extruder into strands, with the orifices terminating at the die face of the die plate. The pelletizer includes a powered rotary cutter having a cutter hub mounted on a shaft with a plurality of blades supported from the cutter hub which move against the die face for shearing the extruded polymer strands into pellets as the polymer (or extrudate) is extruded beyond the die face. A water box having inlet and outlet pipes encloses the die face, cutter hub and blades to form a cutting chamber through which water flows to quench and rigidify the extruded polymer strands, thus enabling the cutting blades to better shear the extruded strands into pellets. The flow of water through the cutting chamber defined by the water box also conveys a slurry of the water and sheared pellets through the outlet pipe to a pellet dewaterer and/or a dryer. The above described underwater pelletizers are disclosed in related U.S. patents including U.S. Pat. Nos. 4,123,207, 4,251,198, 4,621,996, 4,728,276 and 5,059,103, 5,624,688, all owned by the assignee of this invention.

Previous water boxes for underwater pelletizers have been made of one piece construction. During the pelletization process, if the polymer or other extrudate strands extruded through the die plate are not properly sheared the polymer strands can "wrap up" around the rotating cutter hub and drive shaft in the water box, and even get into the inlet and outlet pipes. Should cutter hub wrap up occur it has been necessary to separate the water box from the die plate so that the water box can be cleaned. If the pelletizer cannot be rolled back from the die plate, access to the cutter hub is impaired, making cleaning of the water box difficult. As a result, some operators try to clean the water box by taking the cutter hub off from the die plate side of the water box or, worse yet, try to use a towmotor to pull the pelletizer back, damaging the equipment. Therefore, a need exists for a water box that allows easy access to the cutter hub in the event of cutter hub wrap up or other conditions requiring access to the cutter hub or interior of the water box.

SUMMARY OF THE INVENTION

Accordingly, it is an object of the present invention to provide a two-piece water box assembly that facilitates operator access to the cutter hub for easier and faster clean up in the event of cutter hub wrap up or other conditions requiring access to the cutter hub or water box interior.

Another object of the present invention is to provide a water box with a water box main body and a separate inline adapter or mounting ring secured directly to the die plate and separating the water box main body from the die plate.

A further object of the present invention is to provide the water box main body with an inline flange for attachment to the adapter ring that allows the water box main body to be firmly secured to the die plate through the adapter ring, but with fewer connecting elements, thus speeding the water box removal process.

Still another object of the present invention is to provide a water box assembly that can be easily disassembled without breaking the seal between the die plate, the insulation ring gasket and the adapter or mounting ring.

A still further object of the present invention is to provide a water box assembly having reduced water pressure sealing requirements which can therefore be manufactured less expensively.

Yet another object of this invention to be specifically enumerated herein is to provide a water box assembly in accordance with the preceding objects which will conform to conventional forms of manufacture, be of simple construction and easy to use so as to provide an assembly that will be economically feasible, long lasting and relatively trouble free in operation.

In accordance with these and other objects, the water box assembly of the present invention has a multi-piece construction including a water box main body and a water box-to-die plate inline adapter or mounting ring. The water box main body and inline load ring define a cutting chamber between the water inlet and the water and pellet slurry outlet; the inlet and outlet are typically disposed in diametrically opposed relation, such as the water inlet at the bottom of the cutting chamber and the water and pellet slurry outlet at the top. The inline adapter ring is positioned between the water box main body and the die plate, and the adapter ring is separately fastened through the die plate to the extruder inlet housing with a first plurality of fastening elements. The water box main body is then affixed to the inline adapter ring with a second plurality of fastening elements that preferably are fewer in number than the first plurality of fastening elements.

When cleaning of the cutter hub or access to the cutting chamber becomes necessary, the water box main body can be easily removed from the inline adapter ring, using the fewer second plurality of fastening elements. Meanwhile, the inline adapter ring remains fixed to the die plate, and extruder inlet housing, thus maintaining its seal therewith. The fixed adapter ring would keep the die insulation ring sealed as well, thus allowing the water box main body to be removed without breaking the seal between the die plate, insulation ring gasket and the adapter ring.

The foregoing objects together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Although only one preferred embodiment of the present invention is explained in detail, it is to be understood that the invention is not limited in its scope to the details of construction and arrangement of components of this specific embodiment. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 1:
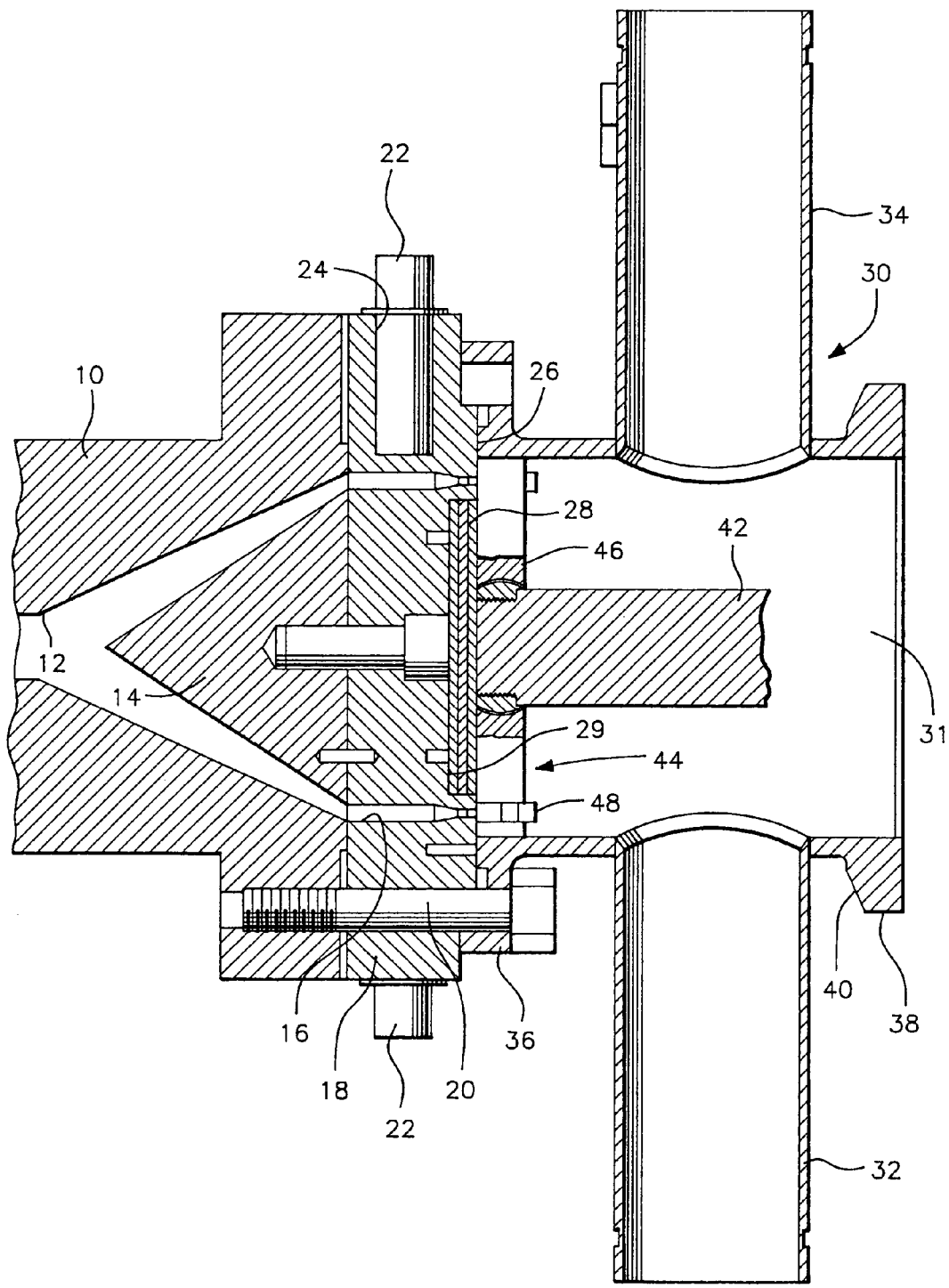
FIG. 1 is a sectional view of an underwater pelletizer having a conventional one-piece water box fastened to the die plate in accordance with the prior art.

FIG. 1 illustrates an underwater pelletizer as disclosed in U.S. Pat. No. 5,624,688, which is hereby incorporated by reference as if fully set forth. The extruder to the pelletizer includes an inlet housing 10 having an inlet passageway 12 for receiving molten polymer or other extrudate from upstream equipment. The molten polymer is diverted outwardly by a nose cone 14 and enters into a plurality of extrusion orifices 16 in a die plate 18. The die plate 18 is secured to the inlet housing by fastening bolts 20 or the like of the pelletizer, and the die plate is typically provided with heating elements 22 located in cavities 24 in the die plate. The die plate 18 includes a die face 26 of wear resistant material which is adhered onto the die plate. Insulation ring gaskets 28 or an insulation plug are mounted in recess 29 of the die plate.

Attached to the housing 10 and die plate 18 is a water box generally designated by reference numeral 30 which includes a cutting chamber 31, a water circulating inlet passageway 32 and discharge passageway 34 for water and pellets. The water box 30 includes a mounting flange 36 for attaching the water box to the die plate 18 and housing 10, and a flange 38 at the opposite end thereof having an inclined surface 40 for association with a similar flange on an adapter connected to a drive unit. A drive shaft 42 extends axially through the cutting chamber 31 and supports and drives a cutter assembly generally designated by reference numeral 44. The cutter assembly 44 includes a cutter hub 46 and a plurality of cutter knives 48 having their cutting edge associated with the die face 26 and the discharge points of the orifices 16.

Another representative underwater pelletizer is disclosed in U.S. Pat. No. 5,059,103 also hereby incorporated by reference as if fully set forth herein. This patent discloses a typical Model 7 pelletizer manufactured by the assignee of this application for which the present invention may be adaptable.

As shown in FIG. 1 of the present drawings, the prior art water box 30 and die plate 18 are attached to the housing 10 by fastening elements 20. There are typically twelve or more of such fastening elements on most pelletizers, each of which must be removed in order to remove the water box 30. These fastening elements are often difficult to access if they are close to the inlet and outlet pipes defining the inlet passageway 32 and discharge passageway 34, respectively. As a result, the size of the pipe that may be used in many water boxes can be limited.

Figure 2:
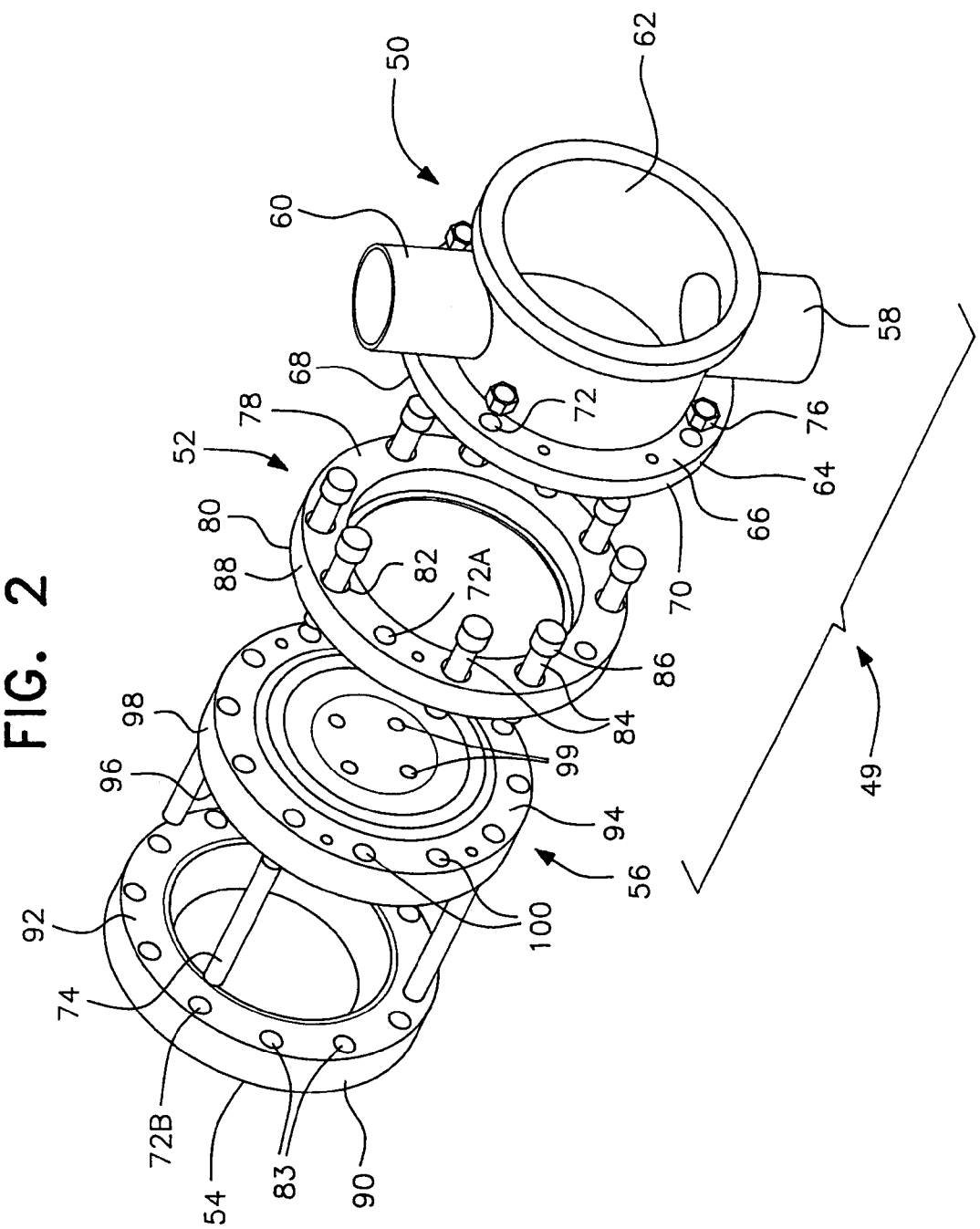
FIG. 2 is an exploded perspective view of a two-piece water box assembly constructed in accordance with the present invention.

The present invention solves this problem through a two-piece water box assembly that reduces the number of fastening elements which must be removed in order to gain access to the cutting chamber for cleaning or other purposes. As illustrated in FIGS. 2–4, the two-piece water box assembly of the present invention is generally designated by reference numeral 49 and includes a water box main body generally designated by reference numeral 50, and an inline adapter or mounting ring generally designated by reference numeral 52. A die plate, generally designated by reference numeral 56, is secured between the adapter ring 52 and the flange 54 of the extruder inlet housing 10. For purposes of description, the water box main body 50 represents the "outer" side of the water box assembly 49, and the adapter ring 54 represents the "inner" side of such water box assembly.

The water box main body 50 includes an inlet pipe 58 and an outlet pipe 60 preferably disposed in diametrically opposed relation and separated by a generally cylindrical chamber housing 62. The body 50 also includes a mounting flange 64 which extends from an inner periphery of the chamber housing 62 and includes an outer surface 66, an inner surface 68 and a cylindrical external surface 70. A plurality of generally circular apertures 72 sized to receive fastening elements 74 extend through the flange 64. In the preferred embodiment shown, the fastening elements 74 are studs to which nuts 76 are secured to join the water box main body 50 to housing flange 54 through the adapter ring 52 and die plate 56.

The adapter ring 52 is an annular ring member aligned with the main body 50 and having a substantially flat outer face 78 that abuts the inner surface 68 of the flange 64 on the water box main body 50. Passing through the flat outer face 78 to a generally flat inner face 80 are a first plurality of generally circular apertures 82 sized to receive bolts or fastening elements 84. The apertures 82 are counter-sunk to receive the heads 86 of the bolts 84 so that, when the bolts 84 are fully inserted, the tops of heads 86 are flush with the outer face 78 or recessed therefrom.

The adapter ring 52 also includes a second plurality of generally circular apertures 72A comparably sized and in alignment with apertures 72 in the main body flange 64 to receive the fastening elements 74. The first and second pluralities of apertures are preferably of the same size, although apertures 72 are not countersunk. The outer face 78 of the adapter ring 52 is machined to fit in close abutment with the inner surface 68 of the flange 64 so that, when joined, the surfaces are sealed tight and the external cylindrical surface 88 of the adapter ring 52 and the external surface 70 of the flange 64 preferably create a generally uniform cylindrical outer surface.

The inlet housing flange 54 also has a cylindrical external surface 90 and a substantially flat outer face 92. Cut into the face 92 are a plurality of generally circular apertures 72B sized to receive and hold the base of fastening elements 74 and a plurality of generally circular apertures 83 sized to threadedly receive the bolts 84 therein. In the preferred embodiment shown, there are four fastening elements 74 which are positioned to straddle the horizontal and vertical centerlines of the adapter ring 54 so as to facilitate access to securing nuts 76 on either side of pipes 58 and 60.

The die plate 56 may be of conventional design and includes a substantially flat die face 94, a substantially flat inner face 96, a cylindrical external surface 98 and a plurality of extrusion or die orifices 99. The die plate 56 shown in FIG. 2 has only four orifices 99, whereas the plate 56 shown in FIGS. 3 and 4 have multiple small orifices for forming micropellets. Passing through the inner face 96 and the outer face 94 are a plurality of circular apertures 100 sized to allow fastening elements 74 and fastening elements 84 to pass therethrough.

The outer face 92 of the housing flange 54 is machined to fit in close abutment with the inner face 96 of the die plate 56, and the inner face 80 of the adapter ring 52 is machined to fit in close abutment with the die face 94 of the die plate 56 so that, when joined together the mating surfaces are tightly sealed and the external surface 90 of the adapter ring 52, the external surface 98 of the die plate 56 and the external surface 88 of the adapter ring 52 preferably create, along with the external surface 70 of the flange 64, a uniform cylindrical outer surface.

Figure 3A:
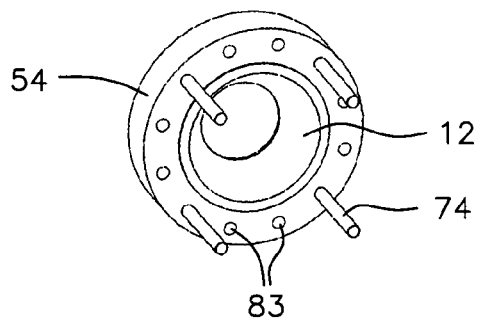
FIGS. 3A–3F are perspective views of the water box assembly in accordance with the present invention, illustrating the components and assembly thereof.
Figure 3B:
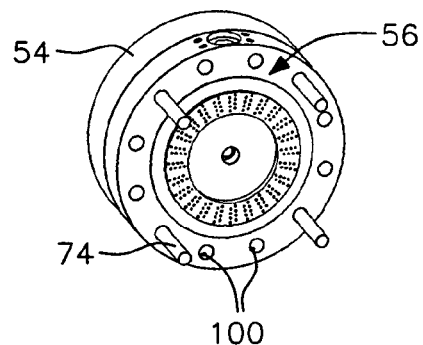
Figure 3C:
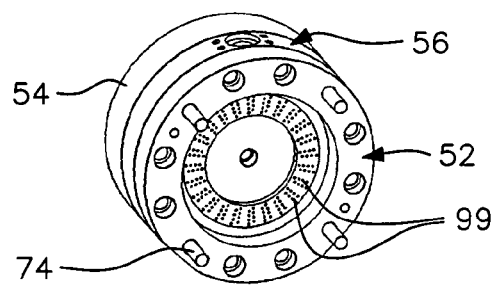
Figure 3D:
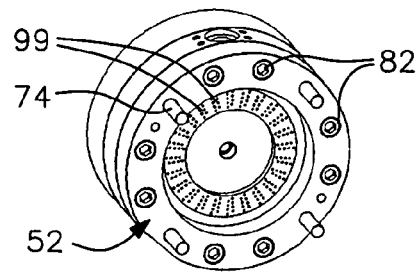
Figure 3E:
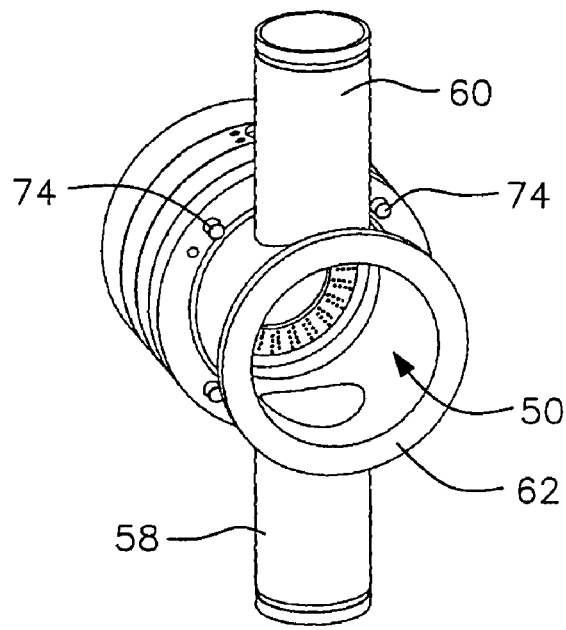
Figure 3F:
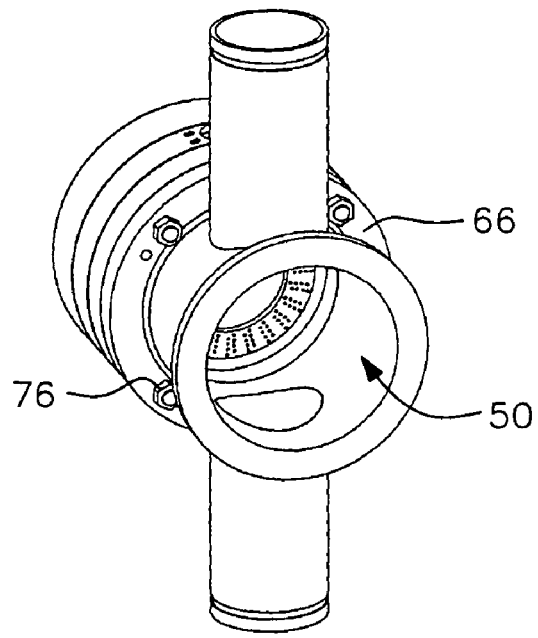
Figure 4:
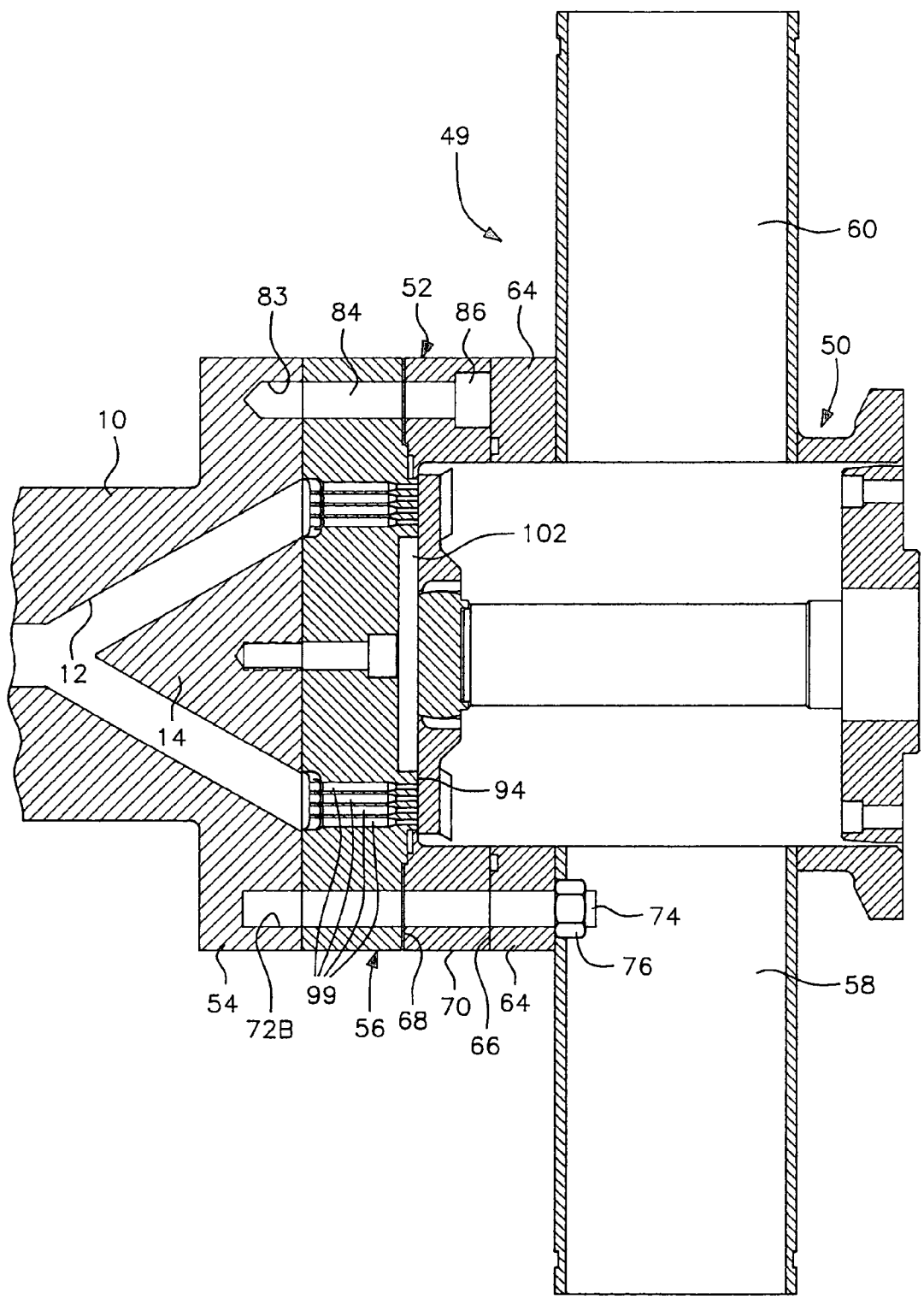
FIG. 4 is a sectional view of a two-piece water box assembly in accordance with the present invention fastened to the die plate in the same manner as shown for the prior water box in FIG. 1.

FIGS. 3A–3F illustrate the assembly of the water box of the present invention. As shown in FIG. 3A, the studs 74 are rigidly installed in the inlet housing flange 54, by screw threads or the like. The die plate 56, which is typically provided with insulation ring gaskets 102 or a solid insulation plug as known by persons of skill in the art, is installed by sliding the same onto the studs 74, as shown in FIG. 3B, followed by the adapter ring 52 as shown in FIG. 3C. The adapter ring 52 is sealingly secured to the die plate 56 and housing inlet flange 54 by installing the fastening elements 84 through holes 82 and 100 and into threaded engagement with apertures 83. The elements 84 may be embodied as socket head cap screw bolts having head 86 which fit flush with the outer face 78 of the adapter ring 52 as illustrated in FIG. 3D. The water box main body 50 is then slid onto the studs 74 with the inlet pipe 58 and outlet pipe 60 in a generally vertical orientation, as shown in FIG. 3E, and nuts 76 are used to tighten the water box main body 50 against the inline adapter ring 52 to complete the installation of the water box assembly as shown in FIG. 3F.

As shown in the embodiment illustrated in FIGS. 2–4, the water box main body 50 is connected to the adapter ring, die plate 56 and extruder housing flange 54 by only four fastening elements 74. In the case of polymer wrap up during the pelletization process, or other reason to access the cutter hub or cutting chamber, only the four fastening elements 74 need to be removed to release the water box. When the water box is pulled from the die plate, the cutter hub and cutting chamber are fully exposed, allowing for faster and easier clean up. At the same time, the inline adapter ring 52 remains tightly and sealingly fastened to the die plate and extruder inlet housing, keeping them sealed. The inline adapter ring also keeps the die insulation ring sealed during water box removal, extending the life of the insulation ring.

Further advantages of the two-piece water box assembly include reduced pressure requirements which allow for less expensive construction. Particularly, the inline adapter ring seals against the polymer pressure, such that the water box need only seal against water pressure from the cutting chamber.

The water box assembly is preferably intended for use on larger sized pelletizers such as the Model 12, G2 and Model 7, as manufactured by the assignee of the present invention.

The foregoing is considered as illustrative only of the principles of the invention. Numerous modifications and changes will readily occur to those skilled in the art. For example, a two-piece water box with a single inline adapter ring, and a water box main body, as disclosed herein, is preferred. However, other multipiece assemblies could be designed to allow easier access to the cutter hub and cutting chamber for clean up and the like.

In another embodiment, the adapter ring 52 and flange 64 could have enlarged outer diameters. In such a construction, the fastening elements 74 might be much shorter and extend only through ring 52 and flange 64, axially outwardly from fasteners 84, rather than extend all the way into extruder inlet housing flange 54. Accordingly, the foregoing preferred embodiment is not intended to limit the invention to the exact construction and operation shown and described. Rather, all suitable modifications and equivalents may be resorted to, falling within the scope of the invention.

What is claimed is as follows:

1. A water box assembly for an underwater pelletizer having a rotating shaft with cutting blades for cutting extruded pellets against a die plate coupled to an extruder housing, which comprises:

a generally cylindrical water box main body having a longitudinal chamber surrounding said rotating shaft and having a flange on an inner periphery nearest said housing; and an annular section coupled between said water box main body and said die plate and secured to said housing by a first plurality of fastening elements, said die plate interfacing directly with said cutting blades, said flange of said water box main body coupled to said annular section with a second plurality of fastening elements so that said water box main body can be released from said annular section, die plate and housing by said second plurality of fastening elements, said annular section including a plurality of substantially circular through-passing apertures for receiving said first and second pluralities of fastening elements which pass therethrough.

2. The water box assembly as set forth in claim 1, wherein said second plurality of fastening elements are fewer in number than said first plurality of fastening elements.

3. The water box assembly as set forth in claim 1, wherein said annular section is sealingly connected to said die plate and said water box main body is sealingly connected to said annular section but is detachable therefrom without breaking said sealing connection between said annular section and said die plate.

4. The water box assembly as set forth in claim 1, wherein said first and second pluralities of fastening elements are interspersed around a circumference of said annular section.

5. The water box assembly as set forth in claim 1, wherein said first plurality of fastening elements are flush with or recessed within an outer face of said annular section which sealingly adjoins an inner face of said flange.

6. The water box assembly as set forth in claim 5, wherein said flange includes a plurality of substantially circular apertures for receiving said second plurality of fastening elements, said flange overlying and covering said first plurality of fastening elements.

7. A water box assembly for a pelletizer having a die plate with extrusion orifices therein coupled to a housing, a driven rotary cutter blade hub supported in opposed relation to said die plate, at least one cutter blade mounted on said blade hub and moving in a plane generally parallel to and closely adjacent said die plate to cut strands of material extruded through said orifices into pellets, said water box assembly comprising a water box main body and an inline adapter defining a cutting chamber adjacent said die plate and enclosing said cutter blade hub and cutter blade, said inline adapter sealingly connected to said die plate and said water box main body sealingly connected to said inline adapter in use but detachable therefrom for access to said cutter blade hub without breaking said sealing connection between said adapter and said die plate, said water box main body being connected to said inline adapter by a plurality of elongated fastening elements, each of said elongated fastening elements passing through a corresponding plurality of substantially circular aligned apertures in a flange of said water box main body, said inline adapter and in said die plate such that each fastening element interconnects all three of said water box main body, said inline adapter and said die plate.

8. The water box assembly as set forth in claim 7, wherein said adapter is generally in the shape of an annular ring.

9. The water box assembly as set forth in claim 8, wherein said inline adapter annular ring has a surface which mates with a corresponding surface of a flange on said water box main body for said sealing connection thereto.

10. The water box assembly as set forth in claim 7, wherein said inline adapter is sealingly connected to said die plate by a further plurality of fastening elements, each of said further plurality of fastening elements extending through and/or into aligned apertures in said inline adapter, said die plate and said housing for interconnection thereof.

11. The water box assembly as set forth in claim 10, wherein said plurality of fastening elements connecting said water box main body to said adapter comprise a plurality of studs secured at first ends thereof in a flange of an extruder inlet housing and extending outwardly therefrom.

12. The water box assembly as set forth in claim 10, wherein said inline adapter includes a further plurality of substantially circular apertures for receiving said further plurality of fastening elements, said further plurality of fastening elements being flush with or recessed within an outer face of said inline adapter which sealingly adjoins said flange on said water box main body.

13. The water box assembly as set forth in claim 12, wherein said water box main body flange overlies and covers said further plurality of fastening elements.

14. The water box assembly as set forth in claim 10, wherein said further plurality of fastening elements is greater in number than the plurality of fastening elements connecting said water box main body to said adapter.

15. A water box assembly for an underwater pelletizer adjacent a die plate at an end of an extruder inlet housing which comprises an inline adapter, a water box main body, a first plurality of fastening elements fastened between said extruder inlet housing and said adapter, each of said first plurality of fastening elements passing through and/or into aligned apertures in each of said housing, said die plate and said inline adapter to sealingly connect together said extruder inlet housing, said die plate and said inline adapter, and a second plurality of fastening elements fastened between said extruder inlet housing and said water box main body, each of said second plurality of fastening elements passing through and/or into aligned apertures in each of said water box main body, said inline adapter, said die elate and said housing to sealingly connect together said water box main body and said housing with said die elate and said inline adapter therebetween.

16. The water box assembly as set forth in claim 15, wherein said water box main body can be disconnected from said inline adapter by releasing said second plurality of fastening elements.

17. The water box assembly as set forth in claim 15, wherein said first plurality of fastening elements are fastened between said extruder inlet housing and said adapter through holes around the periphery of said die plate.

18. The water box assembly as set forth in claim 7, wherein said fastening elements pass through said plurality of substantially circular aligned apertures in said flange, said inline adapter and said die plate and extend into said extruder inlet housing adjacent said die plate.

19. The water box assembly as set forth in claim 1, wherein said plurality of substantially circular apertures includes a first plurality of aligned holes and a second plurality of aligned holes, said first and second plurality of fastening elements passing through said first and second plurality of aligned holes, respectively.

20. The water box assembly as set forth in claim 19, wherein said second fastening elements are fastened between said extruder housing and said water box main body through said second plurality of aligned holes.

* * * * *